(12) United States Patent
Kitabayashi

(10) Patent No.: US 9,203,205 B2
(45) Date of Patent: Dec. 1, 2015

(54) FIBER LASER DEVICE

(71) Applicant: FUJIKURA LTD., Tokyo (JP)

(72) Inventor: Tomoharu Kitabayashi, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 14/612,571

(22) Filed: Feb. 3, 2015

(65) Prior Publication Data

US 2015/0222074 A1 Aug. 6, 2015

(30) Foreign Application Priority Data

Feb. 5, 2014 (JP) ................. 2014-020817

(51) Int. Cl.
*H01S 3/067* (2006.01)
*H01S 3/13* (2006.01)
*H01S 3/131* (2006.01)
*H01S 3/091* (2006.01)

(52) U.S. Cl.
CPC .............. *H01S 3/067* (2013.01); *H01S 3/0675* (2013.01); *H01S 3/06754* (2013.01); *H01S 3/13* (2013.01); *H01S 3/1305* (2013.01); *H01S 3/1317* (2013.01); *H01S 3/091* (2013.01)

(58) Field of Classification Search
CPC ... H01S 3/067; H01S 3/0675; H01S 3/06754; H01S 3/13; H01S 3/1305; H01S 3/1317
See application file for complete search history.

(56) References Cited

FOREIGN PATENT DOCUMENTS

JP 05-206555 A 8/1993

*Primary Examiner* — Armando Rodriguez
(74) *Attorney, Agent, or Firm* — Westerman, Hattori, Daniels & Adrian, LLP

(57) ABSTRACT

A fiber laser device includes: a pumping light source that emits pumping light; an amplification optical fiber that amplifies signal light using the pumping light and emits the signal light; a first FBG that is provided on one side of the amplification optical fiber and reflects the signal light; a second FBG that is provided on the other side of the amplification optical fiber and reflects the signal light at a reflectance lower than a reflectance of the first FBG; a detecting unit that detects with priority to light in a wavelength range between a wavelength 15 nm below and above the maximum reflection wavelength range, in which the reflectance of the first FBG is at the maximum, among lights at the other wavelengths in the light passed through the first FBG from the amplification optical fiber side.

10 Claims, 9 Drawing Sheets

FIBER LASER DEVICE

BACKGROUND OF THE INVENTION

The present invention relates to a fiber laser device that can measure the power of output light, and more specifically to a fiber laser device suited to the case where light of great power is emitted.

Since a fiber laser device has an excellent light gathering property and a high power density and obtains light that is formed in a small beam spot, the fiber laser device is used in various fields such as a laser processing field and a medical field.

In such a fiber laser device, since the power of output light affects processing quality, it is preferable to measure the power of output light. The fiber laser device generally includes a monitor unit inside the device in order that it is enabled to know the power of output light without directly measuring the power of output light by a user.

Patent Document 1 below describes an optical fiber amplifier in which the output light is branched from a rare earth doped fiber and measured. A method for measuring the power of output light used in this optical fiber amplifier is also used in fiber laser devices.
[Patent Document 1] JP-A-H05-206555

SUMMARY OF THE INVENTION

In the fiber laser device described in Patent Document 1, a part of signal light amplified in and emitted from the rare earth doped fiber is branched and measured. However, at the optical branching portion at which a part of this signal light is branched, heat caused by excess attenuation of light is generated. In the case where the power of output light from the fiber laser device is great, there may be a possibility of causing damage due to the heat.

Therefore, it is an object of the present invention to provide a fiber laser device that can measure the power of output light even in the case where light of great power is emitted.

A fiber laser device according to the present invention includes: a pumping light source configured to emit pumping light; an amplification optical fiber configured to amplify signal light by the pumping light and emit the signal light; a first FBG provided on one side of the amplification optical fiber and configured to reflect the signal light; a second FBG provided on the other side of the amplification optical fiber and configured to reflect the signal light at a reflectance lower than the first FBG; and a detecting unit configured to detect light in a wavelength range between a wavelength 15 nm below and above a maximum reflection wavelength range, in which a reflectance of the first FBG is at the maximum, among the light passed through the first FBG from the amplification optical fiber side with priority to light at the other wavelengths.

According to this fiber laser device, since a large part of signal light is reflected at the first FBG, the power of light passed through the first FBG from the amplification optical fiber side is small. Therefore, at least a part of the light is targeted for detection, so that it is possible to suppress damage to the detecting unit even in the case where the fiber laser device emits light of great power.

Moreover, in the lights passed through the first FBG from the amplification optical fiber side, the power of light in the maximum reflection wavelength range of the first FBG becomes extremely small. Meanwhile, generally in the FBG, the reflectance is decreased with wavelength from the maximum reflection wavelength range to the short wavelength side and to the long wavelength side in the wavelength range on the short wavelength side and in the wavelength range on the long wavelength side relative to the maximum reflection wavelength range. Therefore, in the signal light, light in the wavelength range on the short wavelength side and light in the wavelength range on the long wavelength side relative to the maximum reflection wavelength range are passed through the first FBG at transmittances higher than the transmittance of light in the maximum reflection wavelength range. Thus, in the lights passed through the first FBG, the power of light in the wavelength range between a wavelength 15 nm below and above the maximum reflection wavelength range of the first FBG has a strong correlation with the power of signal light passed through and emitted from the second FBG. Therefore, as described above, the power of light in the wavelength range between a wavelength 15 nm below and above the maximum reflection wavelength range of the first FBG is detected. Accordingly, it is possible to indirectly measure the power of signal light emitted from the fiber laser device.

According to the fiber laser device described above, the detecting unit may include a light receiving unit configured to receive light passed through the first FBG from the amplification optical fiber side, and in the light receiving unit, light receiving sensitivity in the wavelength range between a wavelength 15 nm below and above the maximum reflection wavelength range may be higher than light receiving sensitivity at other wavelengths.

The detecting unit includes this light receiving unit, so that it is possible to measure the power of the signal light without using a special component that separates light in a wavelength range between a wavelength 15 nm below and above the maximum reflection wavelength range, from light at the other wavelengths.

Alternatively, according to this fiber laser device, the detecting unit may include: an optical branching portion in which a part of light passed through the first FBG from the amplification optical fiber side is branched; and a light receiving unit configured to receive branched light; and in the optical branching portion, light in the wavelength range between a wavelength 15 nm below and above the maximum reflection wavelength range may be branched with priority to light at the other wavelengths.

The detecting unit includes such optical branching portion, so that it is possible to use a typical light receiving unit. Moreover, in the case of adopting a coupler for the optical branching portion in which a part of the optical fiber through which light passed through the first FBG is propagated is fusion-spliced and extended together with a part of the optical fiber through which branched light is propagated along the longitudinal direction, it is possible that light is branched and propagated to the light receiving unit while suppressing the attenuation of the branched light. Thus, it is possible to easily detect the power of light in the wavelength range between a wavelength 15 nm below and above the maximum reflection wavelength range of the first FBG. Furthermore, in this case, light having a strong correlation with the power of signal light is predominant in the light received at the light receiving unit, so that it is possible to highly accurately measure the power of signal light.

Alternatively, according to the fiber laser device described above, the detecting unit may include: an optical filter configured to pass light in the wavelength range between a wavelength 15 nm below and above the maximum reflection wavelength range with priority to light at the other wavelengths in the light passed through the first FBG from the amplification optical fiber side; and a light receiving unit configured to receive light passed through the optical filter.

The optical filter is excellent in the controllability of the wavelength of light to be passed. Therefore, in the case where light in the wavelength range between a wavelength 15 nm below and above the maximum reflection wavelength range of the first FBG is considered to be a signal that has to be received at the light receiving unit and light at the other wavelengths is considered to be noise, it is possible to freely set the signal-to-noise ratio. More specifically, when the optical filter is configured to pass only light in the wavelength range between a wavelength 15 nm below and above the maximum reflection wavelength range of the first FBG, it is also possible to provide the best signal-to-noise ratio.

Alternatively, according to the fiber laser device described above, the detecting unit includes: a photothermal conversion portion in which a part of light passed through the first FBG from the amplification optical fiber side is absorbed and converted into heat; and a temperature detecting unit configured to detect a temperature of the photothermal conversion portion; and in the photothermal conversion portion, an absorption index of light in the wavelength range between a wavelength 15 nm below and above the maximum reflection wavelength range is higher than an absorption index of light at the other wavelengths.

Since the detecting unit includes this photothermal conversion portion and this temperature detecting unit, it is possible to efficiently convert light in the wavelength range between a wavelength 15 nm below and above the maximum reflection wavelength range of the first FBG into heat in the light entered to the photothermal conversion portion as compared with light at the other wavelengths. Therefore, it is possible to detect the power of light in the wavelength range between a wavelength 15 nm below and above the maximum reflection wavelength range of the first FBG without using the light receiving unit.

Alternatively, it is preferable that the fiber laser device described above further include a control unit configured to control the pumping light source, wherein the control unit decreases power of the pumping light when power of light detected at the detecting unit is a predetermined magnitude or greater. Further, in this case, the control unit may decrease power of the pumping light to zero when power of light detected at the detecting unit is a predetermined magnitude or greater.

The power of the pumping light is decreased or decreased to zero, so that the power of output light can be decreased or decreased to zero. Therefore, for example, even in the case where the output light is reflected at a processed body or the like, again entered to the amplification optical fiber, and amplified as signal light, the power density of light in the amplification optical fiber can be suppressed to be low. Thus, it is possible to suppress such an event that the pumping light source is broken in the case where return light of great power is generated.

After power of the pumping light is decreased, the control unit may return power of the pumping light to original power when power of light detected at the detecting unit is smaller than a predetermined magnitude. Further, the control unit may return power of the pumping light to original power when power of light detected at the detecting unit is smaller than a predetermined magnitude.

The ambient environment of the fiber laser device changes with a lapse of time. For example, even in the case where the reflected light is entered to the amplification optical fiber and amplified as signal light as described above, the state of reflected light is sometimes changed immediately after the power of pumping light is decreased or decreased to zero. Therefore, in the case where the power of light detected at the detecting unit is smaller than a predetermined magnitude, the power of light again detected at the detecting unit is not always a predetermined magnitude or greater even though the power of the pumping light is returned to the original power. Control is made as described above, so that it is possible to emit light of great power as great as possible.

It is preferable that the fiber laser device described above further include a control unit configured to control the pumping light source, wherein the control unit increases power of the pumping light when power of light detected at the detecting unit is smaller than a predetermined magnitude.

The outputs of some of the laser diodes forming the pumping light source are sometimes decreased or some of the laser diodes are broken in using the pumping light source. In this case, the power of light detected at the detecting unit becomes small. Therefore, control is made as described above so that it is possible to suppress a reduction in the power of light emitted from the fiber laser device even in the case where some problem is taken place in the pumping light source. Moreover, in the case where the power of light detected at the detecting unit is a predetermined magnitude or greater as described above, the control unit controls the power of the pumping light to be decreased or to be decreased to zero, so that the power of light detected at the detecting unit sometimes becomes small. Also in this case, the power of the pumping light is increased in the case where the power of light detected at the detecting unit is decreased to a predetermined magnitude or less, so that it is possible to suppress a reduction in the power of light emitted from the fiber laser device.

As described above, according to an aspect of the present invention, there is provided a fiber laser device that can measure the power of output light even in the case where light of great power is emitted.

DETAILED DESCRIPTION OF THE INVENTION

In the following, preferred embodiments of a fiber laser device according to an aspect of the present invention will be described in detail with reference to the drawings.

First Embodiment

Figure 1:
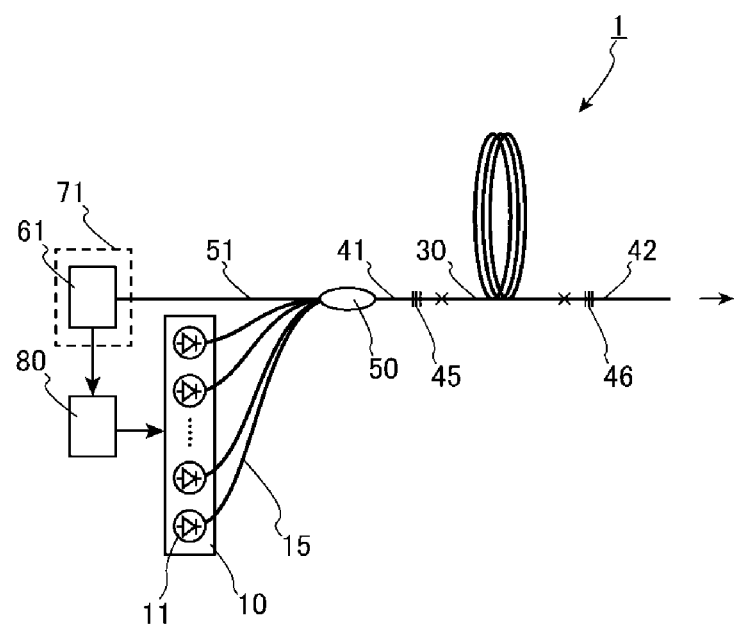
FIG. 1 is a diagram of a fiber laser device according to a first embodiment of the present invention.

FIG. 1 is a diagram of a fiber laser device according to a first embodiment of the present invention. As illustrated in FIG. 1, a fiber laser device 1 according to the embodiment includes a pumping light source 10 that emits pumping light, an amplification optical fiber 30 to which pumping light emitted from the pumping light source 10 is entered and an active element pumped by the pumping light is doped, a first optical fiber 41 connected to one end of the amplification optical fiber 30, a first FBG 45 provided on the first optical fiber 41, a combiner 50 that enters the pumping light into the first optical fiber 41, a second optical fiber 42 connected to the other end of the amplification optical fiber 30, a second FBG 46 provided on the second optical fiber 42, a light receiving unit 61 that receives light passed through the first FBG 45, and a control unit 80 that controls the pumping light source 10, as main components. The amplification optical fiber 30, the first FBG 45, and the second FBG 46 form a resonator, and the fiber laser device 1 according to the embodiment is a resonance fiber laser device.

The pumping light source 10 is configured of a plurality of laser diodes 11, and emits pumping light at a wavelength at which an active element doped in the amplification optical fiber 30 is pumped. The laser diodes 11 of the pumping light source 10 are individually connected to the pumping light optical fibers 15, and light emitted from the laser diodes 11 is propagated through the pumping light optical fibers 15 optically connected to the laser diodes 11. The pumping light optical fiber 15 includes a multimode fiber, for example. In this case, pumping light is propagated through the pumping light optical fiber 15 as multimode light. It is noted that as described later, in the case where an active element doped in the amplification optical fiber 30 is ytterbium, the wavelength of pumping light is a wavelength of 915 nm, for example.

The amplification optical fiber 30 is configured of a core, an inner cladding that encloses the outer circumferential surface of the core with no gap, an outer cladding that covers the outer circumferential surface of the inner cladding, and a buffer layer that covers the outer circumferential surface of the outer cladding. A material forming the core of the amplification optical fiber 30 includes silica doped with an element such as germanium that increases the refractive index, and an active element such as ytterbium (Yb) pumped by light emitted from the pumping light source 10, for example. Such an active element includes rare earth elements. Rare earth elements include thulium (Tm), cerium (Ce), neodymium (Nd), europium (Eu), erbium (Er), or the like, in addition to ytterbium described above. Moreover, an active element includes bismuth (Bi) or the like, in addition to rare earth elements. Furthermore, a material forming the inner cladding of the amplification optical fiber 30 includes pure silica in which no dopant is doped, for example. In addition, a material forming the outer cladding of the amplification optical fiber 30 includes a resin having a refractive index lower than that of the inner cladding, for example, and a material forming the buffer layer of the amplification optical fiber 30 includes an ultraviolet curing resin different from one forming the outer cladding, for example. The amplification optical fiber is a single mode fiber. However, such a configuration may be provided in which light in the single mode is propagated although the core diameter is the same as the core diameter of the multimode fiber in such a manner that signal light of great power can be propagated through the core of the amplification optical fiber. Moreover, in the case where the quality of a light beam propagated through the core does not matter, the amplification optical fiber 30 may be a multimode fiber.

The first optical fiber 41 is in the same configuration as the configuration of the amplification optical fiber 30 except that any active element is not doped in the core. The first optical fiber 41 is connected to one end of the amplification optical fiber 30 as the center axis of the core is aligned with the center axis of the core of the amplification optical fiber 30. Therefore, the core of the amplification optical fiber 30 is optically coupled to the core of the first optical fiber 41, and the inner cladding of the amplification optical fiber 30 is optically coupled to the inner cladding of the first optical fiber 41.

Moreover, the first FBG 45 is provided on the core of the first optical fiber 41. Thus, the first FBG 45 is provided on one end side of the amplification optical fiber 30. The first FBG 45 is configured in which a portion of a high refractive index is repeated in a regular cycle along the longitudinal direction of the first optical fiber 41. The cycle is adjusted, and the first FBG 45 reflects light at a specific wavelength in light emitted from the active element of the amplification optical fiber 30 in the pumping state. In the case where the active element doped in the amplification optical fiber 30 is ytterbium as described above, the first FBG 45 has the maximum reflection wavelength range in which the reflectance is at the maximum, the maximum reflection wavelength range including a wavelength of 1,070 nm, and the first FBG 45 reflects light at a reflectance of 99% or more, for example, in the wavelength range.

Moreover, in the combiner 50, the core of the pumping light optical fiber 15 is connected to the inner cladding of the first optical fiber 41. Thus, the pumping light optical fibers 15 connected to the pumping light source 10 are optically coupled to the amplification optical fiber 30 through the first optical fiber 41.

Furthermore, in the combiner 50, an optical fiber 51 is connected to the first optical fiber 41. The optical fiber 51 is an optical fiber having the core in the same diameter as the diameter of the core of the first optical fiber 41, for example. The core of the optical fiber 51 is connected to the core of the first optical fiber 41.

The second optical fiber 42 is configured of a core similar to the core of the amplification optical fiber 30 except that any active element is not doped, a cladding that encloses the outer circumferential surface of the core with no gap in the configuration similar to the configuration of the inner cladding of the amplification optical fiber 30, and a buffer layer that covers the outer circumferential surface of the cladding. The second optical fiber 42 is connected to the other end of the amplification optical fiber 30 as the axis is aligned with the axis of the amplification optical fiber 30. Therefore, the core of the amplification optical fiber 30 is optically coupled to the core of the second optical fiber 42.

Moreover, the second FBG 46 is provided on the core of the second optical fiber 42. Thus, the second FBG 46 is provided on the other end side of the amplification optical fiber 30. The second FBG 46 is configured in which a portion of a high refractive index is repeated in a regular cycle along the longitudinal direction of the second optical fiber 42. Furthermore, the second FBG 46 has the reflection wavelength range within the maximum reflection wavelength range of the first FBG 45, and is configured to reflect light at a wavelength range that is at least a part of the wavelength of light reflected at the first FBG 45 at a reflectance lower than the reflectance in the maximum reflection wavelength range of the first FBG 45. The second FBG 46 is configured to reflect light at the same wavelength as the wavelength of light reflected at the first FBG 45 at a reflectance of 50% at the maximum, for example.

The light receiving unit 61 is optically connected on the opposite side of the combiner 50 of the optical fiber 51. The light receiving unit 61 is configured in which in the light passed through the first FBG 45 from the amplification optical fiber 30 side, the light receiving sensitivity of light in the wavelength range between a wavelength 15 nm below and above the maximum reflection wavelength range of the first FBG 45 is higher than the light receiving sensitivity of light at the other wavelengths. The light receiving unit 61 in such a configuration includes a photodiode in which the light receiving sensitivity of light in a predetermined wavelength range is higher than the light receiving sensitivity of light in the other wavelength ranges, for example. In the embodiment, the light receiving unit 61 is a detecting unit 71. Therefore, the detecting unit 71 can detect the power of light in the wavelength range between a wavelength 15 nm below and above the maximum reflection wavelength range of the first FBG 45 with priority to the power of light at the other wavelengths in the light passed through the first FBG 45 from the amplification optical fiber 30 side. The detecting unit 71 outputs a signal of the power of light detected at the light receiving unit 61. It is noted that in the case where a signal outputted from the light receiving unit 61 is an analog signal, the detecting unit 71 may include an AD converter or the like as necessary.

The control unit 80 is electrically connected to the detecting unit 71 (the light receiving unit 61), and the signal from the detecting unit 71 is inputted to the control unit 80. The control unit 80 is configured including a CPU (Central Processing Unit), for example. The control unit 80 can control the pumping light source 10.

Next, the operation of the fiber laser device 1 will be described.

First, the control unit 80 controls the pumping light source 10, and pumping light is emitted from the laser diodes 11 of the pumping light source 10. The pumping light emitted from the pumping light source 10 is entered from the pumping light optical fiber 15 to the inner cladding of the amplification optical fiber 30 through the inner cladding of the first optical fiber 41. The pumping light entered to the inner cladding of the amplification optical fiber 30 is mainly propagated through the inner cladding, and pumps the active element doped in the core when passed through the core of the amplification optical fiber 30. The active element in the pumping state emits spontaneous emission light at a specific wavelength. The spontaneous emission light is propagated through the core of the amplification optical fiber 30, light at a part of the wavelength is reflected at the first FBG 45, light at the wavelength reflected at the second FBG 46 in the reflected light is reflected at the second FBG 46, and the light goes and returns in the resonator (between the first FBG 45 and the second FBG 46). The going and returning light is signal light. The signal light is amplified by stimulated emission when propagated through the core of the amplification optical fiber 30, and turned into the laser oscillation state. When the signal light is turned into the laser oscillation state, the energy of the active element in the pumping state is used for stimulated emission, and the power of ASE (Amplified Spontaneous Emission) is decreased. A part of the amplified signal light is passed through the second FBG 46, and emitted from the end portion of the second optical fiber 42 as output light. Moreover, at least other part of the amplified signal light is passed through the first FBG 45.

Figure 2A:
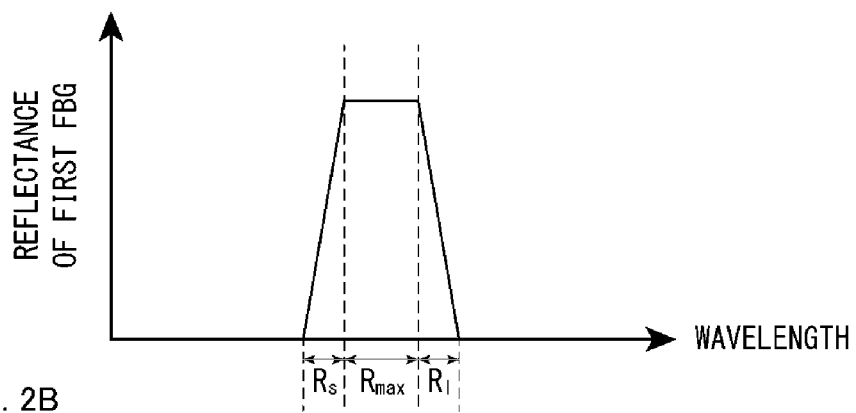
FIGS. 2A to 2C are diagrams of the characteristics of a first FBG.
Figure 2B:
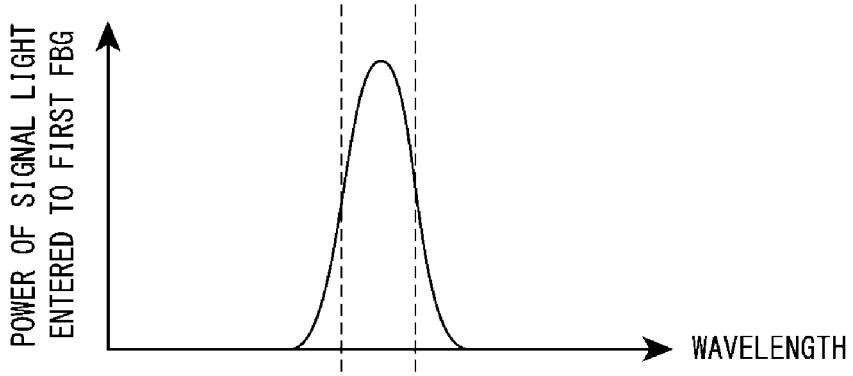
Figure 2C:
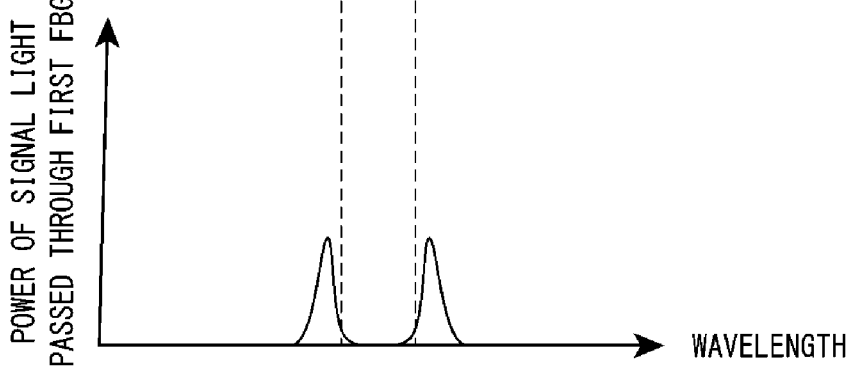

FIGS. 2A to 2C are diagrams of the characteristics of the first FBG 45. More specifically, FIG. 2A is the relationship between the wavelength of light reflected at the first FBG 45 and the reflectance, FIG. 2B is the relationship between power and the wavelength of signal light entered to the first FBG 45 from the amplification optical fiber 30 side, and FIG. 2C is the relationship between power and the wavelength of signal light passed through the first FBG 45 from the amplification optical fiber 30 side.

As illustrated in FIG. 2A, the first FBG 45 has a maximum reflection wavelength range $R_{max}$ in which the reflectance is at the maximum, and the reflectance of the maximum reflection wavelength range $R_{max}$ is at a reflectance of 99% or more, for example. In the first FBG 45, in a wavelength range $R_s$ next to the short wavelength side of the maximum reflection wavelength range $R_{max}$ and a wavelength range $R_l$ next to the long wavelength side of the maximum reflection wavelength range $R_{max}$, the reflectance is decreased with wavelength apart from the maximum reflection wavelength range $R_{max}$. The FBG generally has these reflection characteristics.

The signal light reflected at the second FBG 46 is propagated through the amplification optical fiber 30 toward the first FBG 45 while the wavelength range is expanded, and entered to the first FBG 45. As described above, the reflection wavelength range of the second FBG 46 is within the maximum reflection wavelength range $R_{max}$ of the first FBG 45. Because of this, as illustrated in FIG. 2B, the signal light entered to the first FBG 45 has the peak of power in the maximum reflection wavelength range $R_{max}$, and the power is decreased with wavelength apart from this wavelength. Therefore, the power of the signal light entered to the first FBG 45 in the wavelength ranges $R_s$ and $R_l$ is smaller than power in the maximum reflection wavelength range $R_{max}$. However, as described with reference to FIG. 2A, the reflectance of the first FBG 45 is formed lower in the wavelength ranges $R_s$ and $R_l$ than in the maximum reflection wavelength range $R_{max}$. Thus, as illustrated in FIG. 2C, in the light passed through the first FBG 45, the power of light in the wavelength range $R_s$ and the power of light in the wavelength range $R_l$ are greater than the power of light in the maximum reflection wavelength range $R_{max}$. In the fiber laser device 1 in a resonance structure in which the amplification optical fiber 30 is sandwiched between the first FBG 45 and the second FBG 46 as in the embodiment, in the wavelength range between a wavelength 15 nm below and above the maximum reflection wavelength range $R_{max}$, the power of signal light is predominant as compared with the power of light at the other wavelengths. The wavelength range between a wavelength 15 nm below and above the maximum reflection wavelength range $R_{max}$ means a wavelength range between a wavelength 15 nm shorter from the shortest wavelength in the maximum reflection wavelength range $R_{max}$ and a wavelength 15 nm longer from the longest wavelength in the maximum reflection wavelength range $R_{max}$. In the following, the wavelength range between a wavelength 15 nm below and above the maximum reflection wavelength range $R_{max}$ is sometimes referred to as a specific wavelength range.

The light passed through the first FBG 45 is propagated through the optical fiber 51, and entered to the light receiving unit 61. As described above, in the light receiving unit 61, the wavelength range of high light receiving sensitivity is matched with the specific wavelength range. Therefore, in the power of light detected at the detecting unit 71 including the light receiving unit 61, the power of signal light is predominant.

When a signal expressing the power of light is inputted from the detecting unit 71, the control unit 80 calculates the power of signal light passed through and emitted from the second FBG 46, that is, the power of output light based on the magnitude of this power. Since the power of light in the wavelength range detected at the detecting unit 71, that is, the power of signal light as described above is predominant, the power in the wavelength range detected at the detecting unit 71 has a strong, positive correlation with the power of output light. For example, in the case where the power of output light is increased, the power in the wavelength range detected at the detecting unit 71 is increased, whereas in the case where the power of output light is decreased, the power in the wavelength range detected at the detecting unit 71 is decreased. In the embodiment, the power in the wavelength range detected at the detecting unit 71 is proportional to the power of output light. Therefore, the control unit 80 can easily calculate the power of output light. Thus, the power of output light is measured.

At this time, the control unit 80 may display the power of output light on a display unit, not illustrated.

Moreover, when a signal expressing the power of light is inputted from the detecting unit 71, the control unit 80 controls the pumping light source 10. More specifically, in the case where it is determined that the power of light detected at the detecting unit 71 is a predetermined magnitude or greater, the control unit 80 controls the pumping light source 10 in such a manner that the power of pumping light is decreased. Alternatively, in the case where it is determined that the power of light detected at the detecting unit 71 is a predetermined magnitude or greater, the control unit 80 may control the pumping light source 10 in such a manner that the power of pumping light emitted from the pumping light source 10 is decreased to zero. In the case where the power of light detected at the detecting unit 71 is great, it means that the power of output light emitted from the fiber laser device 1 is great. In this case, the pumping light source 10 controls the power of pumping light to be decreased or to be decreased to zero, so that the amplification factor of the signal light can be suppressed, and the power of output light can be suppressed. Thus, it is possible to prevent such an event that unnecessary light caused by unstable oscillation or by reflection is entered to the pumping light source 10 to damage the pumping light source 10.

Furthermore, after the pumping light source 10 controls the power of pumping light to be decreased or to be decreased to zero, at a point in time or later when the power of light detected at the detecting unit 71 is smaller than a predetermined magnitude, the control unit 80 again may control the pumping light source 10 to again increase the power of pumping light. The power of pumping light at this time may be the same as the power of pumping light when it is determined that the power of light detected at the detecting unit 71 is a predetermined magnitude or greater. This is because the ambient environment of the fiber laser device 1 changes with a lapse of time. For example, even in the case where the output light is applied to a process target, reflected on the target, entered to the amplification optical fiber 30, and again amplified as signal light, the state of reflected light is sometimes changed immediately after the power of pumping light is decreased or decreased to zero. Therefore, in the case where the power of light detected at the detecting unit 71 becomes smaller than a predetermined magnitude, even though the power of pumping light is returned to original power, the power of light again detected at the detecting unit 71 does not always become a predetermined magnitude or greater. Control is made as described above, so that it is possible to emit light of great power as great as possible. Alternatively, in the case where the power of pumping light is again increased, the power of this pumping light may be made smaller than the power of pumping light when it is determined that the power of light detected at the detecting unit 71 is a predetermined magnitude or greater.

Moreover, the control unit 80 may control the pumping light source 10 to increase the power of pumping light in the case where the power of light detected at the detecting unit 71 becomes smaller than a predetermined magnitude, not limited to the case after the pumping light source 10 controls the power of pumping light to be decreased or to be decreased to zero as described above. There is sometimes the case where the outputs of some of the laser diodes 11 configuring the pumping light source 10 are decreased or some of the laser diodes 11 are broken while emitting pumping light from the pumping light source 10. In this case, the power of light detected at the detecting unit 71 is decreased. Therefore, the control unit 80 thus controls the pumping light source 10, so that it is possible to suppress a reduction in the power of light emitted from the fiber laser device 1, even in the case where some problem is taken place in the pumping light source 10.

As described above, in accordance with the fiber laser device 1 according to the embodiment, the detecting unit 71 detects the power of light in the specific wavelength range with priority to the power of light at the other wavelengths in the light passed through the first FBG 45. Since a large part of signal light is reflected in the first FBG 45 as described above, the power of light passed through the first FBG 45 from the amplification optical fiber 30 side is small. Therefore, at least a part of the light is targeted for detection, so that it is possible to suppress damage to the detecting unit 71 even in the case where the fiber laser device 1 emits light of great power.

Moreover, as described above, the power of signal light is predominant in the power of light in the specific wavelength range. Thus, the detecting unit 71 detects the power of light in the specific wavelength range with priority to the power of light at the other wavelengths as described above, so that it is possible to measure the power of amplified signal light emitted from the fiber laser device 1.

Second Embodiment

Next, a second embodiment of the present invention will be described in detail with reference to FIGS. 3, 4, and 5. It is noted that components the same as or equivalent to the components according to the first embodiment are designated the same reference numerals and signs, and the overlapping description will be omitted unless otherwise specifically described.

Figure 3:
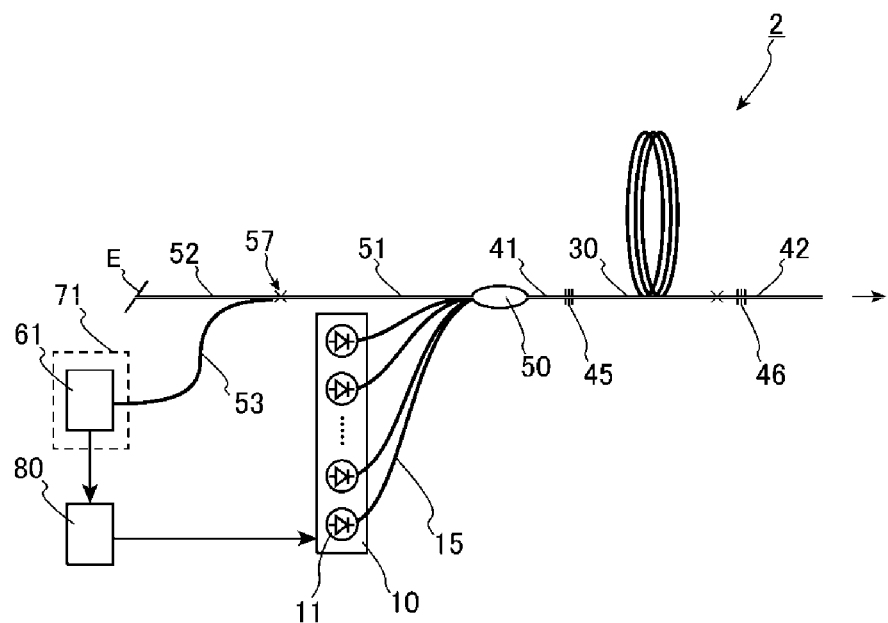
FIG. 3 is a diagram of a fiber laser device according to a second embodiment of the present invention.

FIG. 3 is a diagram of a fiber laser device according to the second embodiment of the present invention. As illustrated in FIG. 3, a fiber laser device 2 according to the embodiment is different from the fiber laser device 1 according to the first embodiment in that an optical fiber 52 is connected to an optical fiber 51 on the opposite side of a combiner 50, a thermal conversion unit E is connected on the opposite side of the optical fiber 52 on the optical fiber 51 side, one end of an optical fiber 53 is disposed near a connecting portion 57 between the optical fiber 51 and the optical fiber 52, and a light receiving unit 61 is connected to the optical fiber 53.

Figure 4:
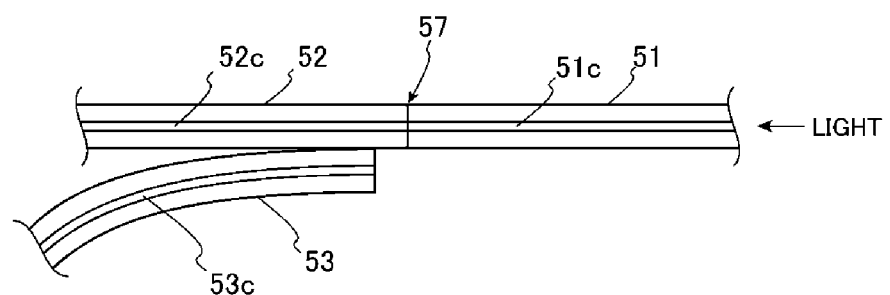
FIG. 4 is a diagram of a configuration in which a part of light passed through the first FBG is branched using a connecting portion.
Figure 5:
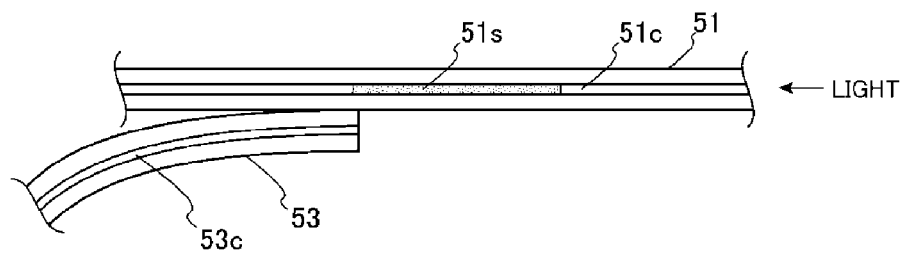
FIG. 5 is a diagram of a configuration in which a part of light passed through the first FBG is branched using a scattering portion.

FIG. 4 is an enlarged diagram around the connecting portion 57 between the optical fiber 51 and the optical fiber 52. It is noted that in FIG. 4, the buffer layers of the optical fibers are omitted. The optical fiber 52 and the optical fiber 53 are optical fibers similar to the optical fiber 51, for example. In the case where optical fibers are connected to each other, light leaks from the connecting point even though the optical fibers are connected to each other in the ideal state as much as possible. Therefore, light leaks from the connecting portion 57 when light is entered from a core 51c of the optical fiber 51 to a core 52c of the optical fiber 52. Therefore, as illustrated in FIG. 4, one end portion of the optical fiber 53 is disposed on the optical fiber 52 side near the connecting portion 57 in such a manner that a part of light leaking from the connecting portion 57 is entered to a core 53c of the optical fiber 53, and the optical fiber 53 is disposed in such a manner that the vicinity of the end portion is put together along the optical fiber 52. In this configuration, the connecting portion 57 functions as an optical branching portion.

In the fiber laser device 2 in this configuration, similarly to the fiber laser device 1 according to the first embodiment, signal light is amplified in an amplification optical fiber 30, and the amplified signal light is emitted from a second optical fiber 42. At this time, light passed through a first FBG 45 is propagated through the optical fiber 51 similarly to the fiber laser device 1 according to the first embodiment. When the light is propagated from the optical fiber 51 to the optical fiber 52, light leaks in the connecting portion 57. A part of the leaking light is entered to the core 53c of the optical fiber 53, and is received at the light receiving unit 61. In other words, in the fiber laser device 1 according to the first embodiment, the light receiving unit 61 is configured to directly receive light passed through the first FBG 45 and propagated through the optical fiber 51. However, in the fiber laser device 2 according to the embodiment, a part of light passed through the first FBG 45 is branched, and received at the branched light receiving unit 61. Also in the embodiment, similarly to the fiber laser device 1 according to the first embodiment, the light receiving unit 61 is a detecting unit 71.

Similarly to the fiber laser device 1 according to the first embodiment, the detecting unit 71 detects the power of light in the specific wavelength range with priority to the power of light at the other wavelengths. When a signal expressing the power of light detected at the detecting unit 71 is inputted from the light receiving unit 61 to a control unit 80, the control unit 80 controls a pumping light source 10 similarly to the fiber laser device 1 according to the first embodiment.

In accordance with the fiber laser device 2 according to the embodiment, in the case where the power of light passed through the first FBG 45 and propagated through the optical fiber 52 is too large, the power of light entered to the optical fiber 53 can be decreased. Therefore, it is possible to suppress damage to the light receiving unit 61 by heat.

It is noted that in the fiber laser device 2 according to the embodiment, the connecting portion 57 is used for the optical branching portion. However, a scattering portion is formed on the optical fiber through which light passed through the first FBG 45 is propagated and the scattering portion may be used as the optical branching portion. FIG. 5 is a diagram of a configuration in which a part of light passed through the first FBG is branched using the scattering portion. It is noted that in FIG. 5, the buffer layers of the optical fibers are omitted. As illustrated in FIG. 5, in this example, a scattering portion 51s is provided on a part of the core 51c of the optical fiber 51. A part of light propagated through the core 51c scatters in the scattering portion 51s, and leaks out of the optical fiber 51. This scattering portion 51s can be formed by applying ultraviolet rays to the position at which the scattering portion 51s is formed in the case where germanium is doped in the core 51c of the optical fiber 51, for example. One end portion of the optical fiber 53 is disposed on the emission side of the optical fiber 51 near the scattering portion 51s in such a manner that a part of light leaking from the scattering portion 51s is entered to the core 53c of the optical fiber 53, and the optical fiber 53 is disposed in such a manner that the vicinity of the end portion is put together along the optical fiber 51. With this configuration, the scattering portion 51s functions as the optical branching portion, and a part of branched light is propagated through the optical fiber 53, and received at the light receiving unit 61 similarly to the embodiment described above.

Moreover, in the embodiment, light leaking from the connecting portion 57 or the scattering portion 51s is entered to the light receiving unit 61 using the optical fiber 53. However, such a configuration may be provided in which the light receiving unit 61 is disposed next to the connecting portion 57 or the scattering portion 51s and light leaking from the connecting portion 57 or the scattering portion 51s is directly entered to the light receiving unit 61, not through the optical fiber 53.

Third Embodiment

Next, a third embodiment according to the present invention will be described in detail with reference to FIG. 6. It is noted that components the same as or equivalent to the components according to the second embodiment are designated the same reference numerals and signs, and the overlapping description will be omitted unless otherwise specifically described.

Figure 6:
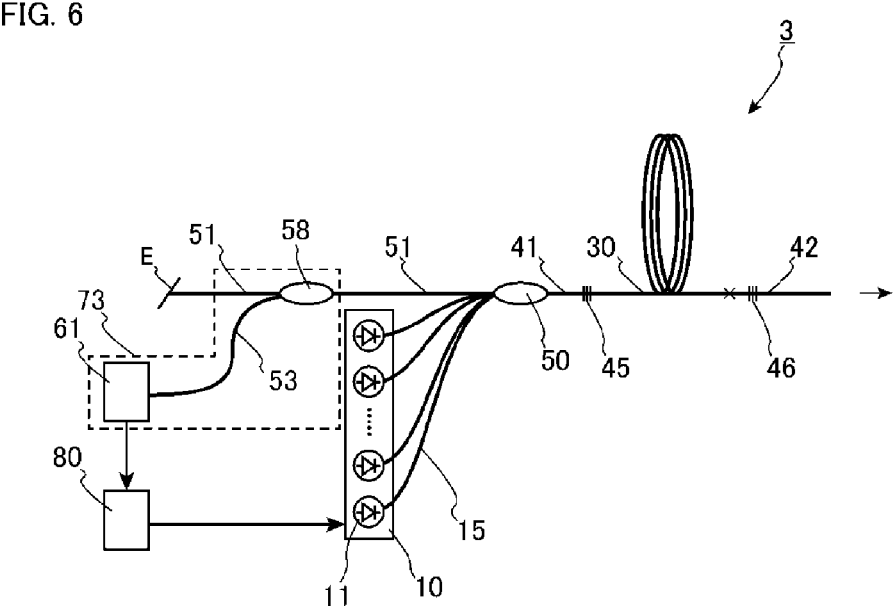
FIG. 6 is a diagram of a fiber laser device according to a third embodiment of the present invention.

FIG. 6 is a diagram of a fiber laser device according to the third embodiment of the present invention. As illustrated in FIG. 6, a fiber laser device 3 according to the embodiment is different from the fiber laser device 2 according to the second embodiment in that the optical fiber 52 of the fiber laser device 2 according to the second embodiment is not included and a coupler 58 is provided in the midway point of an optical fiber 51.

The coupler 58 is an optical branching portion that branches light in the specific wavelength range in light passed through a first FBG 45 and propagated through the optical fiber 51 and passes light at the other wavelengths. This coupler 58 is configured in which, for example, the optical fiber 51 is put together along an optical fiber 53 in the midway point of the optical fiber 51 and the optical fiber 51 and the optical fiber 53 are extended and fusion-spliced with each other. The length of the optical fiber 51 and the optical fiber 53 put together and fusion-spliced with each other is adjusted, and the configuration is provided in which light at a predetermined wavelength is branched and light at the other wavelengths is passed as described above.

In the embodiment, the coupler 58 that is the optical branching portion described above, the optical fiber 53, and a light receiving unit 61 form a detecting unit 73 that detects the power of light in the specific wavelength range with priority to the power of light at the other wavelengths. It is noted that the detecting unit 73 may include an AD converter or the like as necessary in the case where a signal outputted from the light receiving unit 61 is an analog signal.

In the fiber laser device 3 in this configuration, signal light is amplified in an amplification optical fiber 30, and the amplified signal light is emitted from a second optical fiber 42, similarly to the fiber laser device 2 according to the second embodiment. At this time, light passed through the first FBG 45 is propagated through the optical fiber 51, similarly to the fiber laser device 2 according to the second embodiment. In the coupler 58, in the light passed through the first FBG 45, light in the specific wavelength range is branched, and light at the other wavelengths is passed through the coupler 58 and propagated through the optical fiber 51. The branched light is propagated through a core 53c of an optical fiber 53. The light entered to the optical fiber 53 is received at the light receiving unit 61, and in the light receiving unit 61, light in the specific wavelength range is detected with priority to light at the other wavelengths. As described in the first embodiment, the light receiving unit 61 is configured in which the light receiving sensitivity in the specific wavelength range is higher than the light receiving sensitivity at the other wavelengths. Thus, in the case where light at the other wavelengths is branched as noise at the coupler 58, the light receiving unit 61 can highly accurately detect the power of light in the specific wavelength range more than in the case of using a light receiving unit not specifically including the sensitivity characteristics according to wavelengths. Moreover, light in the specific wavelength range is branched at the coupler 58, so that the detecting unit 73 can detect the power of light in the specific wavelength range in the state of an excellent signal-to-noise ratio as compared with the detecting unit 71 of the fiber laser device 2 according to the second embodiment while using the light receiving unit 61 the same as one according to the second embodiment, in the case where in the light entered to the light receiving unit 61, light in the specific wavelength range is considered to be a signal that is to be detected, and light at the other wavelengths is considered to be noise that is not to be detected.

In the fiber laser device 3 according to the embodiment, the optical branching portion is the coupler 58 that integrally fusion-splices a part of the optical fiber 51 with a part of the optical fiber 53 in the state in which the optical fibers are put together along the longitudinal direction. This coupler can branch and propagate light to the light receiving unit 61 in a small attenuation of the light in the wavelength range to be branched. Thus, it is possible to easily detect the power of light in the specific wavelength range.

It is noted that in the embodiment, the light receiving unit 61 may be configured not to include the sensitivity characteristics according to wavelengths more specifically. Even in this configuration, light in the specific wavelength range is branched in the coupler 58, so that the detecting unit 73 can detect the power of light in the specific wavelength range. However, as described above, it is preferable that the light receiving unit 61 be configured to detect light in the specific wavelength range with priority to light at the other wavelengths because the power of light in the specific wavelength range can be more highly accurately detected. Moreover, since the light receiving unit 61 has the light receiving sensitivity of light in the specific wavelength range higher than the light receiving sensitivity of light at the other wavelengths, the light receiving unit 61 can be considered to be the detecting unit similarly to the detecting unit 71 according to the first embodiment.

Figure 7:
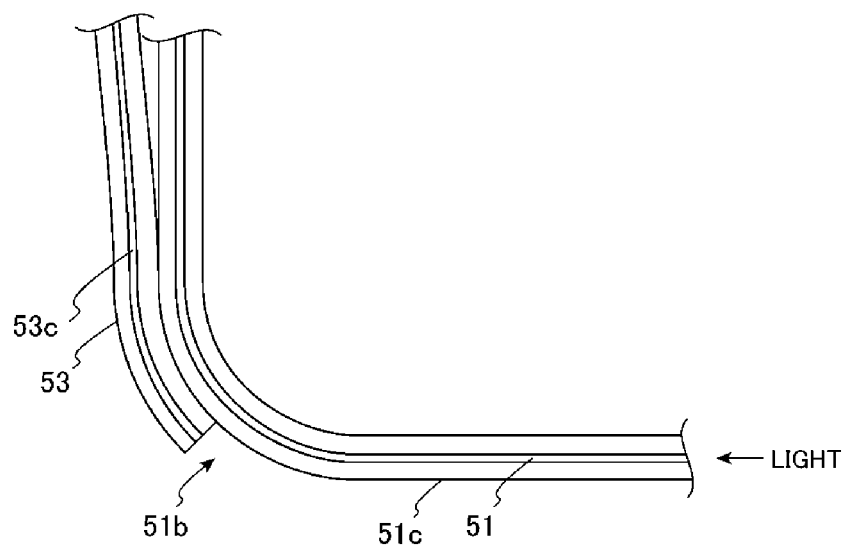
FIG. 7 is a diagram of a manner in which the bent portion of an optical fiber is used for an optical branching portion.
Figure 8:
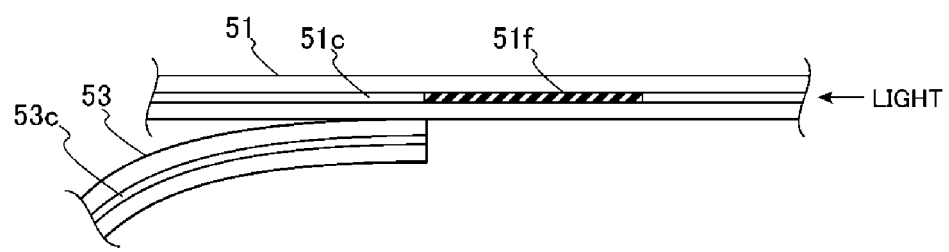
FIG. 8 is a diagram of a manner in which a slanted FBG is used for an optical branching portion.

Furthermore, in the embodiment, the coupler 58 is used for the optical branching portion that branches light in the specific wavelength range with priority to light at the other wavelengths. This optical branching portion is not limited to the coupler 58. FIG. 7 is a diagram of a manner in which the bent portion of the optical fiber 51 is used for the optical branching portion. It is noted that in FIG. 7, the buffer layers of the optical fibers are omitted. In the optical fiber, the wavelength of light leaking from a bent portion is generally determined in the case where the relative refractive index difference between the core and the cladding and the bending radius of the optical fiber are determined. For example, in the case where the maximum reflection wavelength range $R_{max}$ of the first FBG 45 ranges from a wavelength of 1,094.0 nm to a wavelength of 1,099.5 nm, in order to cause light in the specific wavelength range to leak from the bent portion, it is fine that for example, the NA of the core of the optical fiber 51 is 0.14, the mode field diameter is 6.2 μm, and the bending radius of the optical fiber 51 is about 40 mm. Therefore, as illustrated in FIG. 8, a bent portion 51b is formed in which the optical fiber 51 is bent in the bending radius that light in the specific wavelength range leaks. One end portion of the optical fiber 53 is disposed near the bent portion 51b in such a manner that a part of light leaking from the bent portion 51b is entered to the core 53c of the optical fiber 53, and the optical fiber 53 is disposed in such a manner that the vicinity of the end portion is put together along the optical fiber 51. With this configuration, the bent portion 51b functions as the optical branching portion, and light in the specific wavelength range is branched with priority to light at the other wavelengths. The branched light is propagated through the optical fiber 53, and received at the light receiving unit 61 similarly to the embodiment described above.

Alternatively, a slanted FBG can also be used for the optical branching portion at which light in the specific wavelength range is branched with priority to light at the other wavelengths. FIG. 8 is a diagram of a manner in which a slanted FBG is used as the optical branching portion. It is noted that in FIG. 8, the buffer layers of the optical fibers are omitted. As illustrated in FIG. 8, in this example, a slanted FBG 51f is provided on a part of the core 51c of the optical fiber 51. The slanted FBG 51f is configured in which a portion of a high refractive index is repeated in a regular cycle along the longitudinal direction of the optical fiber 51 and the high refractive index portion and the low refractive index portion are sloped with respect to the plane perpendicular to the longitudinal direction of the optical fiber 51. The cycle is adjusted, and the slanted FBG 51f is configured in which light in the specific wavelength range is reflected to the outside of the optical fiber 51 and light at the other wavelengths is passed. One end portion of the optical fiber 53 is disposed on the thermal conversion unit E side of the optical fiber 51 in the vicinity of the slanted FBG 51f in such a manner that a part of light reflected at the slanted FBG 51f is entered to the core 53c of the optical fiber 53, and the optical fiber 53 is disposed in such a manner that the vicinity of the end portion is put together along the optical fiber 51. With this configuration, the slanted FBG 51f functions as the optical branching portion, light in the specific wavelength range is branched with priority to light at the other wavelengths, and the branched light is propagated through the optical fiber 53, and received at the light receiving unit 61 similarly to the embodiment described above.

It is noted that such a configuration may be provided in which in the case where the bent portion 51b or the slanted FBG 51f is provided as the optical branching portion, the light receiving unit 61 is disposed next to the bent portion 51b or the slanted FBG 51f, and light leaking from the bent portion 51b or the slanted FBG 51f is directly entered to the light receiving unit 61 not through the optical fiber 53, instead of entering light leaking from the bent portion 51b or the slanted FBG 51f to the light receiving unit 61 using the optical fiber 53.

Fourth Embodiment

Next, a fourth embodiment of the present invention will be described in detail with reference to FIG. 9. It is noted that components the same as or equivalent to the components according to the first embodiment are designated the same reference numerals and signs, and the overlapping description will be omitted unless otherwise specifically described.

Figure 9:
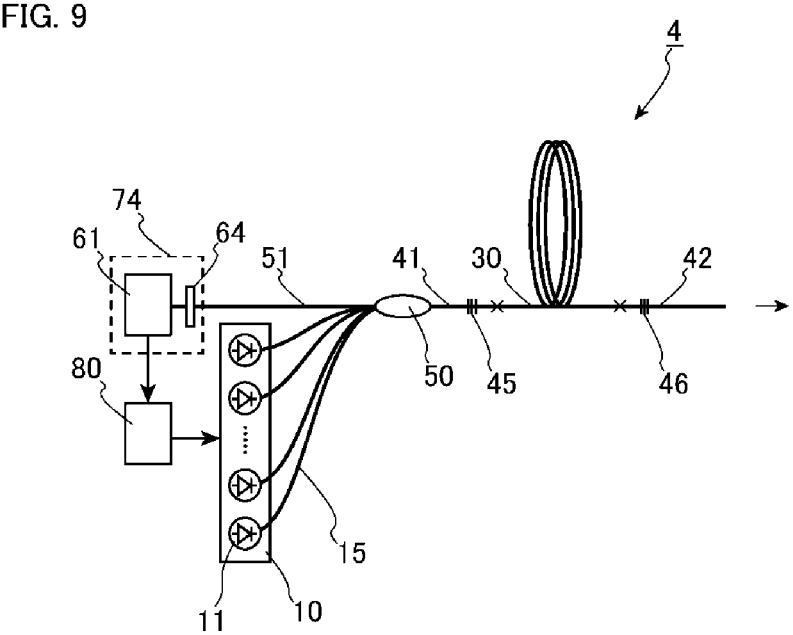
FIG. 9 is a diagram of a fiber laser device according to a fourth embodiment of the present invention.

FIG. 9 is a diagram of a fiber laser device according to the fourth embodiment of the present invention. As illustrated in FIG. 9, a fiber laser device 4 according to the embodiment is different from the fiber laser device 1 according to the first embodiment in that an optical filter 64 is provided in the midway point of an optical fiber 51.

The optical filter 64 is configured in which light in the specific wavelength range is passed with priority to light at the other wavelengths. This optical filter 64 is formed of a stacked body of oxide films, for example. In the embodiment, the optical filter 64 and a light receiving unit 61 form a detecting unit 74 that detects the power of light in the specific wavelength range with priority to the power of light at the other wavelengths. It is noted that in the case where a signal outputted from the light receiving unit 61 is an analog signal, the detecting unit 74 may include an AD converter or the like as necessary.

In the fiber laser device 4 in this configuration, signal light is amplified in an amplification optical fiber 30, and the amplified signal light is emitted from a second optical fiber 42, similarly to the fiber laser device 1 according to the first embodiment. At this time, as described in the first embodiment, light passed through the first FBG 45 is propagated through the optical fiber 51. However, the optical filter 64 enters light in the specific wavelength range to the light receiving unit 61 with priority to light at the other wavelengths. Therefore, at the light receiving unit 61, light in the specific wavelength range is detected with priority to light at the other wavelengths. Additionally, as described in the first embodiment, the light receiving unit 61 is configured in which the light receiving sensitivity in the specific wavelength range is higher than the light receiving sensitivity at the other wavelengths. Therefore, the light receiving unit 61 can highly accurately detect the power of light in the specific wavelength range more than in the case where such a light receiving unit is used for the light receiving unit in which the light receiving sensitivity in the specific wavelength range is similar to the light receiving sensitivity at the other wavelengths, even in the case where light at the other wavelengths other than light in the specific wavelength range is passed as noise through the optical filter 64. Moreover, the optical filter 64 passes light in the specific wavelength range with priority to light at the other wavelengths, so that the detecting unit 74 can detect the power of light in the specific wavelength range in the state of an excellent signal-to-noise ratio as compared with the detecting unit 71 of the fiber laser device 1 according to the first embodiment while using the light receiving unit 61 the same as one according to the first embodiment in the case where light in the specific wavelength range is considered to be a signal that is to be detected, and light at the other wavelengths is considered to be noise that is not to be detected in the light entered to the light receiving unit 61.

When a signal expressing the power of light detected at the detecting unit 74 is inputted from the light receiving unit 61 to a control unit 80, the control unit 80 controls a pumping light source 10 similarly to the fiber laser device 1 according to the first embodiment.

The optical filter is excellent in the controllability of the wavelength of light to be passed. Therefore, in accordance with the fiber laser device 4 according to the embodiment, the settings of the wavelength of light passed through the optical filter 64 can freely set the control of the signal-to-noise ratio in the case where light in the specific wavelength range is considered to be a signal that has to be received at the light receiving unit 61 and light at the other wavelengths is considered to be noise. More specifically, when the optical filter 64 is configured to pass only light in the specific wavelength range, the signal-to-noise ratio can also be in the best state.

It is noted that in the embodiment, the optical filter 64 is provided in the midway point of the optical fiber 53. However, an optical filter may be provided in the midway point of the optical fiber 53 of the fiber laser device 2 according to the second embodiment. Alternatively, in the fiber laser device 2 according to the second embodiment, light leaking from the connecting portion 57 may directly be entered to the optical filter 64 not through the optical fiber 53 and light emitted from the optical filter 64 is entered to the light receiving unit 61.

Moreover, similarly to the third embodiment, even in the case where such a light receiving unit is used instead of the light receiving unit 61, in which the light receiving sensitivity of light in the specific wavelength range is similar to the light receiving sensitivity of light at the other wavelengths, light in the specific wavelength range is passed through the optical filter 64 with priority. Thus, the detecting unit 74 can detect the power of light in the specific wavelength range with priority to the power of light at the other wavelengths. However, it is preferable to use the light receiving unit 61 because the light receiving unit 61 can highly accurately detect the power of light in the specific wavelength range even in the case where light at the other wavelengths is passed through the optical filter 64 as noise, as described above. Furthermore, in the light receiving unit 61, the light receiving sensitivity of light in the specific wavelength range is higher than the light receiving sensitivity of light at the other wavelengths, so that the light receiving unit 61 can also be considered to be the detecting unit similarly to the detecting unit 71 according to the first embodiment.

Fifth Embodiment

Next, a fifth embodiment of the present invention will be described in detail with reference to FIG. 10. It is noted that components the same as or equivalent to the components according to the first embodiment are designated the same reference numerals and signs, and the overlapping description will be omitted unless otherwise specifically described.

Figure 10:
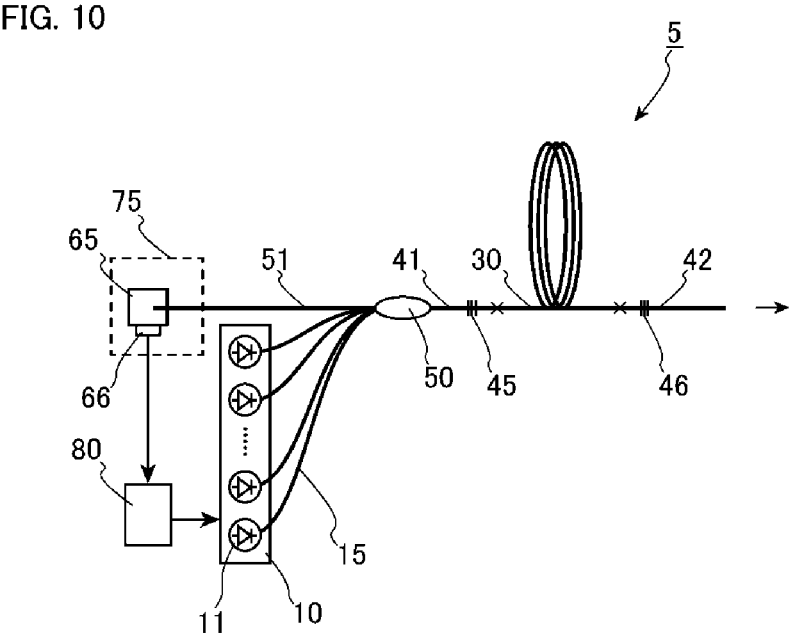
FIG. 10 is a diagram of a fiber laser device according to a fifth embodiment of the present invention.

FIG. 10 is a diagram of a fiber laser device according to the fifth embodiment of the present invention. As illustrated in FIG. 10, a fiber laser device 5 according to the embodiment is different from the fiber laser device 1 according to the first embodiment in that the light receiving unit 61 is not provided, the end portion of an optical fiber 51 is covered with a resin 65, and a temperature detecting unit 66 is provided to detect the temperature of the resin 65.

The resin 65 is a resin that the absorption index of light in the specific wavelength range is better than the absorption index of light at the other wavelengths. A resin having such properties includes specific silicon resins, for example, in the case where the maximum reflection wavelength range $R_{max}$ of a first FBG 45 ranges from a wavelength of 1,094.0 nm to a wavelength of 1,099.5 nm, for example.

A digital thermometer and a thermistor can be used for the temperature detecting unit 66, for example.

In the embodiment, the resin 65 is a photothermal conversion portion that absorbs at least a part of light in the specific wavelength range and converts the light into heat and the temperature detecting unit 66 detects the temperature of the resin 65, and the resin 65 and the temperature detecting unit 66 form a detecting unit 75 that detects the power of light in the specific wavelength range with priority to the power of light at the other wavelengths. It is noted that the detecting unit 75 may include an AD converter or the like as necessary in the case where a signal outputted from the temperature detecting unit 66 is an analog signal.

In the fiber laser device 5 in this configuration, signal light is amplified in an amplification optical fiber 30, and the amplified signal light is emitted from a second optical fiber 42, similarly to the fiber laser device 1 according to the first embodiment. At this time, in the light passed through the first FBG 45, light in the specific wavelength range is mainly absorbed in the resin 65, and light at the other wavelengths is mainly passed through the resin 65. The temperature of the resin 65 that absorbs light in the specific wavelength range is detected at the temperature detecting unit 66. Thus, the power of light in the specific wavelength range is detected as a temperature.

When a signal expressing the power of light detected at the detecting unit 75 is inputted from the temperature detecting unit 66 to the control unit 80 and a signal is inputted from the temperature detecting unit to the control unit 80, the control unit 80 controls a pumping light source 10 similarly to the fiber laser device 1 according to the first embodiment.

In accordance with the fiber laser device 5 according to the embodiment, the power of light in the specific wavelength range can be detected without using the light receiving unit. Therefore, it is possible to provide a simple configuration to the fiber laser device.

It is noted that in the fiber laser device 5 according to the embodiment, the resin 65 is provided so as to cover the end portion of the optical fiber 51. However, in the fiber laser device 2 according to the second embodiment, for example, the portion around the connecting portion 57 or the scattering portion 51s may be covered with the resin 65. Alternatively, the portion around the bent portion 51b or the slanted FBG 51f of the optical fiber 51 according to the third embodiment may be covered with the resin 65. Moreover, in the embodiment, the resin 65 is used for the photothermal conversion portion. However, other materials may be used for the photothermal conversion portion, not limited to a resin as long as the absorption index of light in the specific wavelength range is better than the absorption index of light at the other wavelengths.

As described above, the present invention is described as the embodiments are taken as examples. However, the present invention is not limited to the embodiments, and can be appropriately modified.

EXAMPLE

In the following, the content of an aspect of the present invention will be described more in detail with reference to an example. However, the present invention is not limited to the example.

Figure 11:
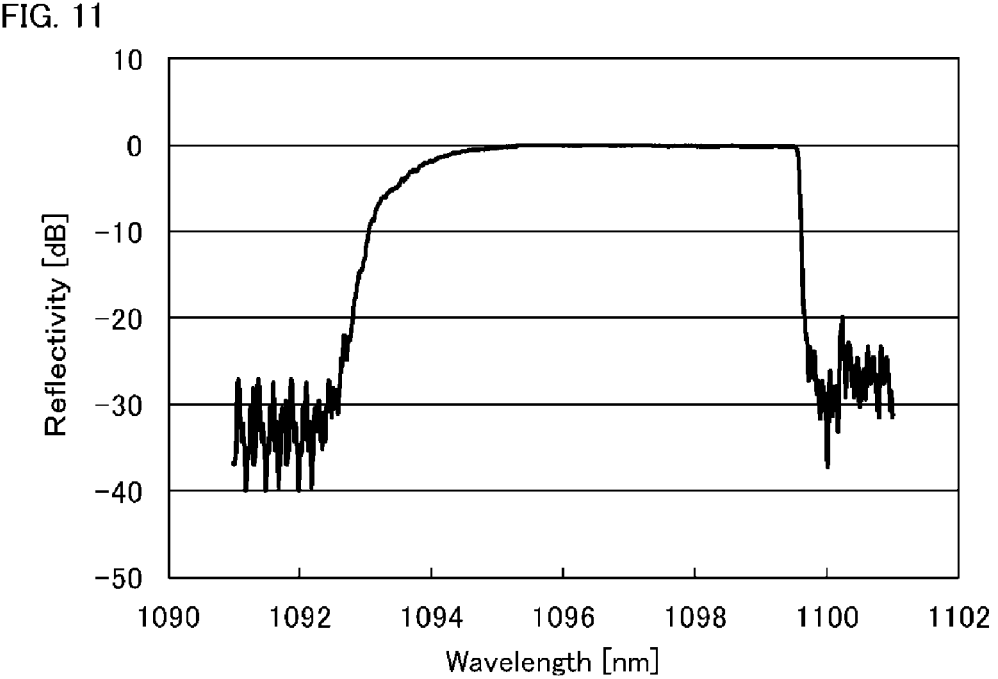
FIG. 11 is a diagram of the characteristics of the optical reflectivity of the first FBG.
Figure 12:
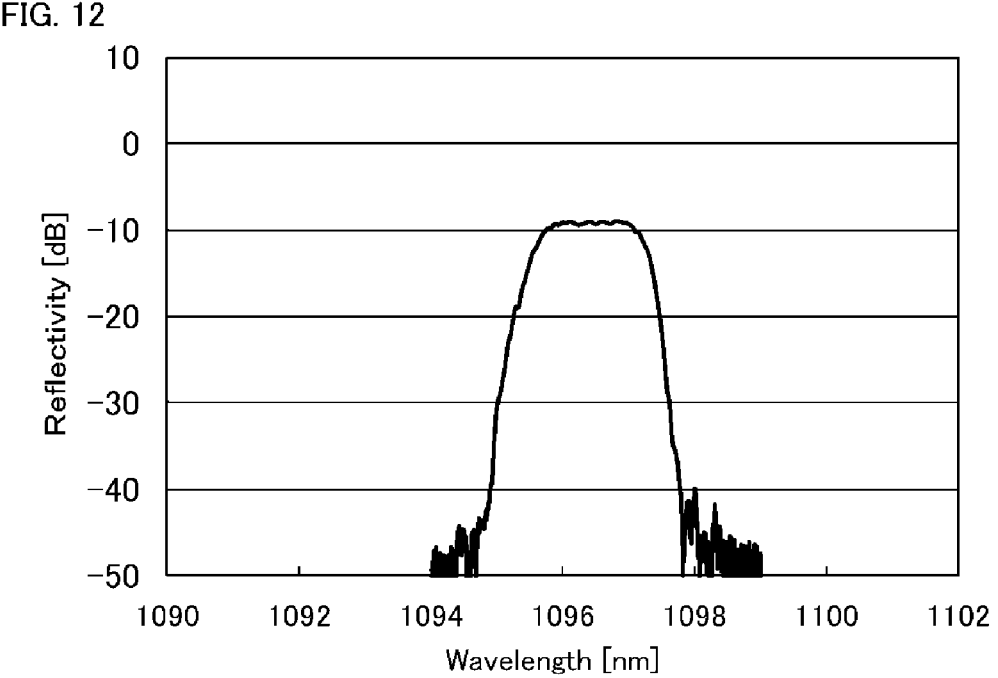
FIG. 12 is a diagram of the characteristics of the optical reflectivity of a second FBG.
Figure 13:
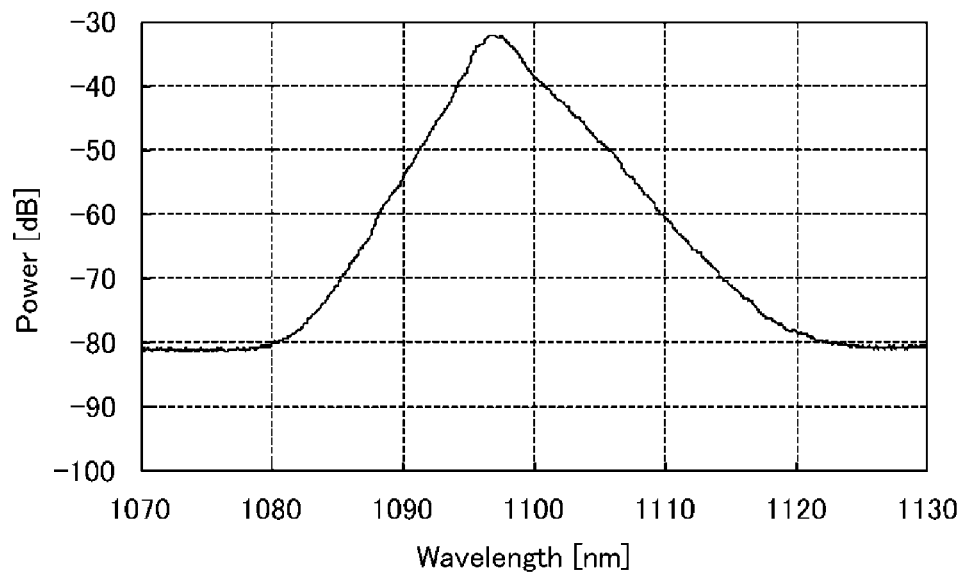
FIG. 13 is a diagram of the power spectrum with respect to the wavelength of signal light incident on the first FBG.
Figure 14:
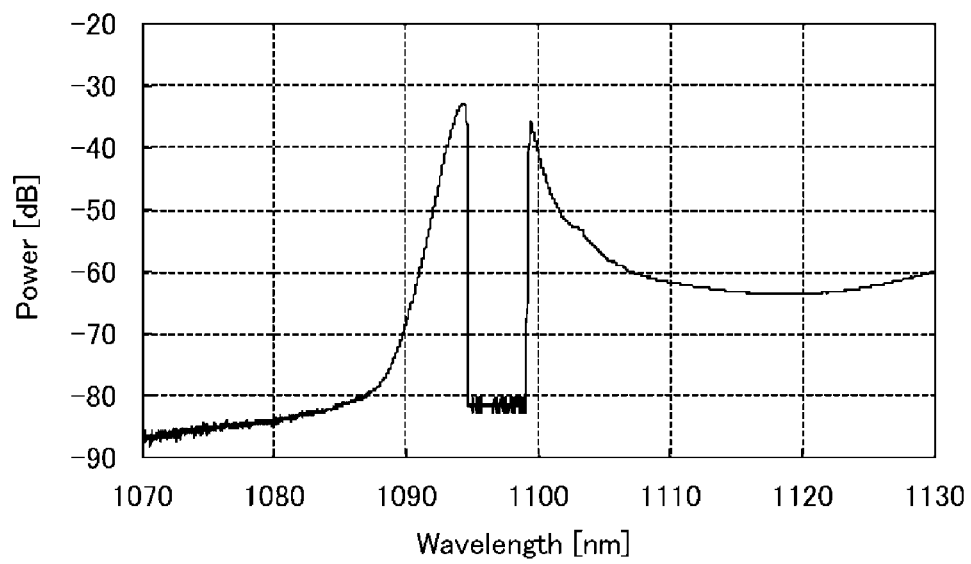
FIG. 14 is a diagram of the power spectrum with respect to the wavelength of light passed through the first FBG.

A fiber laser device similar to the fiber laser device 1 according to the first embodiment was prepared. An amplification optical fiber in which ytterbium was doped as an active element in the core was used for the amplification optical fiber 30. Moreover, the light reflection characteristics of a first FBG 45 of this fiber laser device are as shown in FIG. 11. The maximum reflection wavelength range was between wavelengths of 1,094 nm to a wavelength of 1,099.5 nm. Moreover, the light reflection characteristics of a second FBG 46 are shown in FIG. 12. Furthermore, such a configuration was provided in which six laser diodes were used for pumping light sources, in which light at a wavelength of 915 nm was emitted at 60 watts and pumping light at 300 watts at the maximum was entered to the amplification optical fiber 30. The spectrum of the light reflected at the second FBG 46 is spread in the process of amplification in the amplification optical fiber 30. In the fiber laser device 1 in this configuration, the power spectrum was measured with respect to the wavelength of signal light incident on the first FBG 45, and the result was as shown in FIG. 13. This spectrum was measured in a separate experimental system configured to be similar to the fiber laser device 1. However, this result is applicable to the fiber laser device 1. In addition, the power spectrum with respect to the wavelength of light including signal light passed through the first FBG 45 and light other than the signal light was as shown in FIG. 14.

Figure 15:
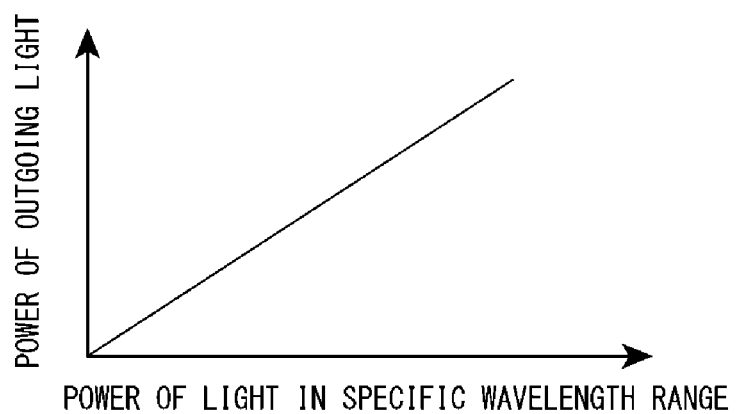
FIG. 15 is a diagram of the relationship between the power of output light and the power of light in a wavelength range between a wavelength 15 nm below and above the maximum reflection wavelength range of the first FBG.

Subsequently, the power of light in the wavelength range between a wavelength 15 nm below and above the maximum reflection wavelength range (light in the specific wavelength range) received at the light receiving unit 61 and the power of output light emitted from the second optical fiber 42 were measured. FIG. 15 is a diagram of the relationship between the power of light in the specific wavelength range and the power of output light. As illustrated in FIG. 15, it is shown that the power of light in the specific wavelength range is proportional to the power of output light. Therefore, it was shown that according to an aspect of the present invention, the power of output light can be measured.

The invention claimed is:
1. A fiber laser device comprising:
a pumping light source configured to emit pumping light;
an amplification optical fiber configured to amplify signal light by the pumping light and emit the signal light;
a first FBG provided on one side of the amplification optical fiber and configured to reflect the signal light;
a second FBG provided on the other side of the amplification optical fiber and configured to reflect the signal light at a reflectance lower than the first FBG; and
a detecting unit configured to detect, among the light passed through the first FBG from the amplification optical fiber side, light in a specific wavelength range with priority to light at other wavelengths,
wherein the specific wavelength range is a wavelength range between a wavelength 15 nm below and above a maximum reflection wavelength range, in which a reflectance of the first FBG is at the maximum.
2. The fiber laser device according to claim 1, wherein
the detecting unit includes a light receiving unit configured to receive light passed through the first FBG from the amplification optical fiber side, and
in the light receiving unit, light receiving sensitivity in the wavelength range between a wavelength 15 nm below and above the maximum reflection wavelength range is higher than light receiving sensitivity at other wavelengths.
3. The fiber laser device according to claim 1, wherein
the detecting unit includes:
an optical branching portion in which a part of light passed through the first FBG from the amplification optical fiber side is branched; and
a light receiving unit configured to receive branched light; and
in the optical branching portion, light in the wavelength range between a wavelength 15 nm below and above the maximum reflection wavelength range is branched with priority to light at the other wavelengths.
4. The fiber laser device according to claim 1, wherein
the detecting unit includes:
an optical filter configured to pass light in the wavelength range between a wavelength 15 nm below and above the maximum reflection wavelength range with priority to light at the other wavelengths in the light passed through the first FBG from the amplification optical fiber side; and
a light receiving unit configured to receive light passed through the optical filter.
5. The fiber laser device according to claim 1, wherein
the detecting unit includes:

a photothermal conversion portion in which a part of light passed through the first FBG from the amplification optical fiber side is absorbed and converted into heat; and a temperature detecting unit configured to detect a temperature of the photothermal conversion portion; and in the photothermal conversion portion, an absorption index of light in the wavelength range between a wavelength 15 nm below and above the maximum reflection wavelength range is higher than an absorption index of light at the other wavelengths.

6. The fiber laser device according to claim 1, further comprising a control unit configured to control the pumping light source, wherein the control unit decreases power of the pumping light when power of light detected at the detecting unit is a predetermined magnitude or greater.

7. The fiber laser device according to claim 6, wherein after power of the pumping light is decreased, the control unit returns power of the pumping light to original power when power of light detected at the detecting unit is smaller than a predetermined magnitude.

8. The fiber laser device according to claim 6, wherein the control unit decreases power of the pumping light to zero when power of light detected at the detecting unit is a predetermined magnitude or greater.

9. The fiber laser device according to claim 8, wherein after power of the pumping light is decreased to zero, the control unit returns power of the pumping light to original power when power of light detected at the detecting unit is smaller than a predetermined magnitude.

10. The fiber laser device according to claim 1, further comprising a control unit configured to control the pumping light source, wherein the control unit increases power of the pumping light when power of light detected at the detecting unit is smaller than a predetermined magnitude.

* * * * *